US011734797B2

(12) United States Patent
Kalchbrenner et al.

(10) Patent No.: US 11,734,797 B2
(45) Date of Patent: *Aug. 22, 2023

(54) ITERATIVE MULTISCALE IMAGE GENERATION USING NEURAL NETWORKS

(71) Applicant: DeepMind Technologies Limited, London (GB)

(72) Inventors: Nal Emmerich Kalchbrenner, Amsterdam (NL); Daniel Belov, London (GB); Sergio Gomez Colmenarejo, London (GB); Aaron Gerard Antonius van den Oord, London (GB); Ziyu Wang, Markham (CA); Joao Ferdinando Gomes de Freitas, London (GB); Scott Ellison Reed, Atlanta, GA (US)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,359

(22) Filed: May 23, 2022

(65) Prior Publication Data

US 2022/0284546 A1 Sep. 8, 2022

Related U.S. Application Data

(63) Continuation of application No. 16/324,061, filed as application No. PCT/EP2018/054614 on Feb. 26, 2018, now Pat. No. 11,361,403.

(Continued)

(51) Int. Cl.
*G06T 3/40* (2006.01)
*G06N 20/00* (2019.01)
*G06N 3/045* (2023.01)

(52) U.S. Cl.
CPC .......... *G06T 3/4046* (2013.01); *G06N 3/045* (2023.01); *G06N 20/00* (2019.01); *G06T 3/4076* (2013.01)

(58) Field of Classification Search
CPC ..... G06T 3/4046; G06T 3/4076; G06N 20/00; G06N 3/0454
See application file for complete search history.

(56) References Cited

U.S. PATENT DOCUMENTS 10,515,435 B2 * 12/2019 Navarrete Michelini ................... G06N 3/0454
2017/0024632 A1    1/2017 Johnson et al.
(Continued)

FOREIGN PATENT DOCUMENTS

CN       102770887           11/2012
EP        3748572 A1 *       12/2020  ............... G06N 3/04
(Continued)

OTHER PUBLICATIONS

Andriluka et al., "2d human pose estimation: New benchmark and state of the art analysis," IEEE Conference on Computer Vision and Pattern Recognition, 2014, 8 pages.
(Continued)

*Primary Examiner* — Charles T Shedrick
(74) *Attorney, Agent, or Firm* — Fish & Richardson P.C.

(57) ABSTRACT

A method of generating an output image having an output resolution of N pixels×N pixels, each pixel in the output image having a respective color value for each of a plurality of color channels, the method comprising: obtaining a low-resolution version of the output image; and upscaling the low-resolution version of the output image to generate the output image having the output resolution by repeatedly performing the following operations: obtaining a current version of the output image having a current K×K resolution; and processing the current version of the output image
(Continued)

using a set of convolutional neural networks that are specific to the current resolution to generate an updated version of the output image having a 2K×2K resolution.

34 Claims, 4 Drawing Sheets

Related U.S. Application Data

(60) Provisional application No. 62/463,538, filed on Feb. 24, 2017.

(56) References Cited

U.S. PATENT DOCUMENTS

| | | | |
|---|---|---|---|
| 2020/0342572 A1* | 10/2020 | Chen | G06N 3/08 |
| 2022/0284547 A1* | 9/2022 | Wang | G06N 3/084 |

FOREIGN PATENT DOCUMENTS

| | | |
|---|---|---|
| JP | 2002281294 | 9/2002 |
| JP | 2007328735 | 12/2007 |
| JP | 2013090204 | 5/2013 |
| JP | 2017500651 | 1/2017 |
| KR | 1020110049570 | 5/2011 |

OTHER PUBLICATIONS

Anwar et al., "Learning separable fixed-point kernels for deep convolutional neural network," IEEE Xplore, 5 pages.
Dahl et al., "Pixel recursive super resolution," arXiv, Mar. 2017, 22 pages.
Deng et al., "ImageNet: A large-scale hierarchical image database," CVPR, 2009, 8 pages.
Denton et al., "Deep generative image models using a Laplacian pyramid of adversarial networks," arXiv, Jun. 2015, 10 pages.
Dinh et al., "Density estimation using Real NVP," arXiv, Feb. 2017, 32 pages.
Dong et al., "Accelerating the super resolution convolutional neural network," arXiv, dated Aug. 1, 2016, 17 pages.
EP Office Action in European Appln. No. 18707702.9, dated May 19, 2021, 7 pages.
Finn et al., "Unsupervised learning for physical interaction through video prediction" arXiv, Oct. 2016, 12 pages.
github.com [online], "Machine Leanring Note/ Paper Note/ Super Resolution/ Convolutional Neural Network Implementation of Super-resolution Video," dated Apr. 17, 2016, retrieved on Jun. 14, 2018, retreived from: URL< https://github.com/etworker/MachineLeamingNote/tree/master/Paper%20Note/Super%20Resolution/Convolutional%20Neural%20Network%201 mplementation%20of%20Superresolution%20Video> 1 page.
Glasner et al., "Super-resolution from a single image," 2009 IEEE 12th International Conference on Computer Vision, 2009, pp. 349-356.
Goodfellow et al., "Generative adversarial nets," NIPS, 2014, 9 pages.
Gulrajani et al., "PixelVAE: A latent variable model for natural images," arXiv, Nov. 2016, 9 pages.
He et al., "Identity mappings in deep residual networks," arXiv. Jul. 2016, 15 pages.
Johnson et al., "Perceptual losses for real-time style transfer and super-resolution," arXiv, Mar. 2016, 18 pages.
JP Decision to Grant a Patent Appln. No. 2019-538533, dated Feb. 1, 2021, 5 pages (with English translation).
JP Office Action in Japanese Appln. No. 2019-538533, dated Sep. 23, 2020, 8 pages (with English translation).
Kalchbrenner et al., "Neural machine translation in linear time," arXiv, Mar. 2017, 9 pages.

Kalchbrenner et al., "Video pixel networks," arXiv, Oct. 2016, 16 pages.
Kim et al., "Accurate image super-resolution using very deep convolutional networks," arXiv, dated Nov. 11, 2016, 9 pages.
Kingma et al., "Improving variational inference with inverse autoregressive flow," arXiv, Jan. 2017, 16 pages.
KR Office Action in Korean Appln. No. 10-2019-7020922, dated Jul. 21, 2020, 12 pages (with English translation).
KR Office Allowance of Patent in Appln. No. 10-2019-7020922, dated Mar. 30, 2021, 6 pages (with English translation).
Larochelle et al., "The neural autoregressive distribution estimator," AISTATS, 2011, 9 pages.
Ledig et al., "Photo-realistic single image super-resolution using a generative adversarial network," arXiv, May 2017, 19 pages.
Lin et al., "Microsoft COCO: Common objects in context," ECCV, 2014, 16 pages.
Mansimov et al., "Generating images from captions with attention," arXiv, Feb. 2016, 12 pages.
Nguyen et al., "Plug & play generative networks: Conditional iterative generation of images in latent space," arXiv, Apr. 2017, 36 pages.
Ohtani et al., "Super-Resolution with Four Parallel Convulational Neural Networks," IEICE Trans. Inf. & Syst. (Japanese Edition), May 1, 2016, J99-D(5):588-593 (with English absfract).
Oord et al., "Conditional Image Generation with PixelCNN Decoders," arXiv, Cornell University Library, dated Jun. 18, 2016, 13 pages.
Oord et al., "Wavenet: A generative model for raw audio," arXiv, Sep. 2016, 15 pages.
PCT International Search Report and Written Opinion in International Appln. No. PCT/EP2018/054614, dated Jul. 20, 2018, 19 pages.
Ramachandran et al., "Fast generation for convolutional autoregressive models," ICLR, 2017, 4 pages.
Reed et al., "Generating interpretable images with controllable structure," ICLR, 2017, 13 pages.
Reed et al., "Generative adversarial text-to-image synthesis," arXiv, Jun. 2016, 10 pages.
Reed et al., "Learning what and where to draw," arXiv, Oct. 2016, 9 pages.
Salimans et al., "PixelCNN++: Improving the PixelCNN with discretized logistic mixture likelihood and other modifications," arXiv, Jan. 2017, 10 pages.
Shi et al., "Real-time single image and video super-resolution using an efficient sub-pixel convolutional neural network," arXiv, Sep. 2016, 10 pages.
Sonderby et al., "Amortised MAP inference for image super-resolution," arXiv, Feb. 2017, 17 pages.
Theis et al., "Generative image modeling using spatial LSTMs," NIPS, 2015, 9 pages.
Uria et al. "RNADE: The real-valued neural autoregressive density-estimator," NIPS, 2013, 9 pages.
Van den Oord et al., "Conditional image generation with PixelCNN decoders," arXiv, Jun. 2016, 13 pages.
Van den Oord et al. "Pixel recurrent neural networks," arXiv, Aug. 2016, 11 pages.
Wah et al., "The Caltech-UCSD birds-200-2011 dataset," California Institute of Technology, 2011, 8 pages.
Wang et al., "Generative image modeling using style and structure adversarial networks," arXiv, Jul. 2016, 22 pages.
Wu et al., "On the quantitative analysis of decoder-based generative models," arXiv, Jun. 2017, 17 pages.
Zeng et al., "Convolutional neural network implementaion of super-resolutional video," Semantic Scholar, 2016, 7 pages.
Zhang et al., "StackGAN: Text to photo-realistic image synthesis with stacked generative adversarial networks," arXiv, Aug. 2017, 14 pages.
Office Action in Chinese Appln. No. 201880004376.6, dated Nov. 16, 2022, 16 pages.

* cited by examiner

ITERATIVE MULTISCALE IMAGE GENERATION USING NEURAL NETWORKS

CROSS-REFERENCE TO RELATED APPLICATION

This application is a continuation application of U.S. application Ser. No. 16/324,061 filed Feb. 7, 2019, which is a National Stage Application under 35 U.S.C. § 371 and claims the benefit of International Application No. PCT/EP2018/054614, filed Feb. 26, 2018, which claims priority to U.S. Provisional Application Ser. No. 62/463,538, filed on Feb. 24, 2017. The disclosure of the prior application is considered part of and is incorporated by reference in the disclosure of this application.

BACKGROUND

This specification relates to generating images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes systems and methods for generating an output image using multiple sets of convolutional neural networks.

In general, one innovative aspect of the subject matter described in this specification can be embodied in a computer-implemented method of generating an output image having an output resolution of N pixels×N pixels, in which each pixel in the output image has a respective color value for each of a plurality of color channels. The method includes obtaining a low-resolution version of the output image; and upscaling the low-resolution version of the output image to generate the output image having the output resolution by repeatedly performing the following operations: obtaining a current version of the output image having a current K×K resolution; and processing the current version of the output image using a set of convolutional neural networks that are specific to the current resolution to generate an updated version of the output image having a 2K×2K resolution.

The foregoing and other embodiment can each optionally include one or more of the following features, alone or in combination.

Obtaining the low-resolution version may include generating the low-resolution version using an image generation machine learning model. The image generation machine learning model may be an autoregressive image generation machine learning model. The output image may be conditioned on an input context and wherein the image generation machine learning model is configured to generate the low-resolution version conditioned on the input context. Each convolutional neural network in each set of convolutional neural networks may be conditioned on the input context.

The set of convolutional neural networks that are specific to the current resolution may comprise a set of convolutional neural networks (CNNs) that includes two or more CNNS that are used to quadruple the resolution. The set of convolutional neural networks that are specific to the current resolution may include: a first convolutional neural network that is configured to receive a first input comprising the current version of the image and to generate a first output image that includes columns of pixels from a K×2K version of the output image, and a second convolutional neural network that is configured to receive a second input comprising the K×2K version of the output image and to generate a second output image that includes rows of pixels from the 2K×2K version of the output image.

Processing the current version of the output image using the set of convolutional neural networks that are specific to the current resolution to generate the updated version may include: processing the current version using the first convolutional neural network to generate the first output image; generating the K×2K version by merging the current version and the first output image; processing the K×2K version using the second convolutional neural network to generate the second output image; and generating the 2K×2K version by merging the K×2K version and the second output image.

Merging the current version and the first output image may include: generating a K×2K image that includes K columns of pixels from the current image and K columns of pixels from the first output image by alternating columns of pixels from the current version with columns of pixels from the first output image.

Merging the K×2K version and the second output image may include: generating a 2K×2K image that includes K rows of pixels from the K×2K version and K rows of pixels from the second output image by alternating rows of pixels from the K×2K version with rows of pixels from the first output image.

The plurality of color channels are ordered according to a channel order, in which the first convolutional neural network is configured to, for each of the color channels: generate color values for the color channel for pixels in the first output image conditioned (i) on the current version and (ii) on color values for pixels in the first output image for any color channels before the color channel in the channel order and (iii) not on color values for pixels in the first output image for any color channels that are after the color channel in the channel order. The second convolutional neural network is configured to, for each of the color channels: generate color values for the color channel for pixels in the second output image conditioned (i) on the K×2K version and (ii) on color values for pixels in the second output image for any color channels before the color channel in the channel order and (iii) not on color values for pixels in the second output image for any color channels that are after the color channel in the channel order.

Processing the current version using the first convolutional neural network to generate the first output image may include: iteratively processing the current version and color values from the first output image that have already been generated to generate the first output image. Processing the K×2K version using the first convolutional neural network to generate the second output image may include: iteratively processing the K×2K version and the color values from the second output image that have already been generated to generate the second output image.

The set of convolutional neural networks that are specific to the current resolution may include: a first convolutional neural network that is configured to receive a first input comprising the current version of the image and to generate a first output image that includes rows of pixels from a 2K×K version of the output image, and a second convolutional neural network that is configured to receive a second input comprising the 2K×2 version of the output image and to generate a second output image that includes columns of pixels from the 2K×2K version of the output image.

Processing the current version of the output image using the set of convolutional neural networks that are specific to the current resolution to generate the updated version may include: processing the current version using the first convolutional neural network to generate the first output image; generating the 2K×K version by merging the current version and the first output image; processing the 2K×K version using the second convolutional neural network to generate the second output image; and generating the 2K×2K version by merging the 2K×K version and the second output image.

Merging the current version and the first output image may include: generating a 2K×K image that includes K rows of pixels from the current image and K rows of pixels from the first output image by alternating rows of pixels from the current version with rows of pixels from the first output image. Merging the 2K×K version and the second output image may include generating a 2K×2K image that includes K columns of pixels from the 2K×K version and K columns of pixels from the second output image by alternating columns of pixels from the 2K×K version with columns of pixels from the first output image.

The plurality of color channels may be ordered according to a channel order. The first convolutional neural network is configured to, for each of the color channels: generate color values for the color channel for pixels in the first output image conditioned (i) on the current version and (ii) on color values for pixels in the first output image for any color channels before the color channel in the channel order and (iii) not on color values for pixels in the first output image for any color channels that are after the color channel in the channel order. The second convolutional neural network is configured to, for each of the color channels: generate color values for the color channel for pixels in the second output image conditioned (i) on the 2K×K version and (ii) on color values for pixels in the second output image for any color channels before the color channel in the channel order and (iii) not on color values for pixels in the second output image for any color channels that are after the color channel in the channel order.

In a related aspect a method of generating an output image from a lower resolution version of the output image comprises determining a first group of pixels for the output image from the lower resolution version of the image, iteratively generating a succession of values for respective subsequent groups of pixels for the output image, wherein a value for each group of pixels is conditioned upon the previously generated values for the pixel groups; and determining, in parallel within each group of pixels, values of the pixels within the group. The values of the pixels within the groups of pixels define the output image.

In some implementations the pixels are grouped so as to exploit spatial locality. Thus the groups of pixels may be arranged such that no two adjacent pixels of the output image are in the same group. In some implementations the values for the pixel groups may be iteratively generated further conditioned on an external input such as a vector providing context information, which may define a desired output image.

The subject matter described in this specification can be implemented in particular embodiments to realize one or more of the following advantages. By cutting some spatial dependencies relied on by existing image generation models, the processing time required to generate an output image using the auto regressive image generation machine learning model described herein can be greatly reduced with little to no degradation in the quality of the output image. Further, because the processing of the convolutional neural networks employed by the system can be parallelized during training, the networks can still be trained in a resource and time-efficient manner. In addition, the autoregressive image generation machine learning model described in this specification is a proper density model, i.e., images can be generated from the model in a principled way. As such, systems implementing the autoregressive model described herein can compute the probability of real images under the model, evaluate the model, and quantitatively compare the model against other existing image generation models.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
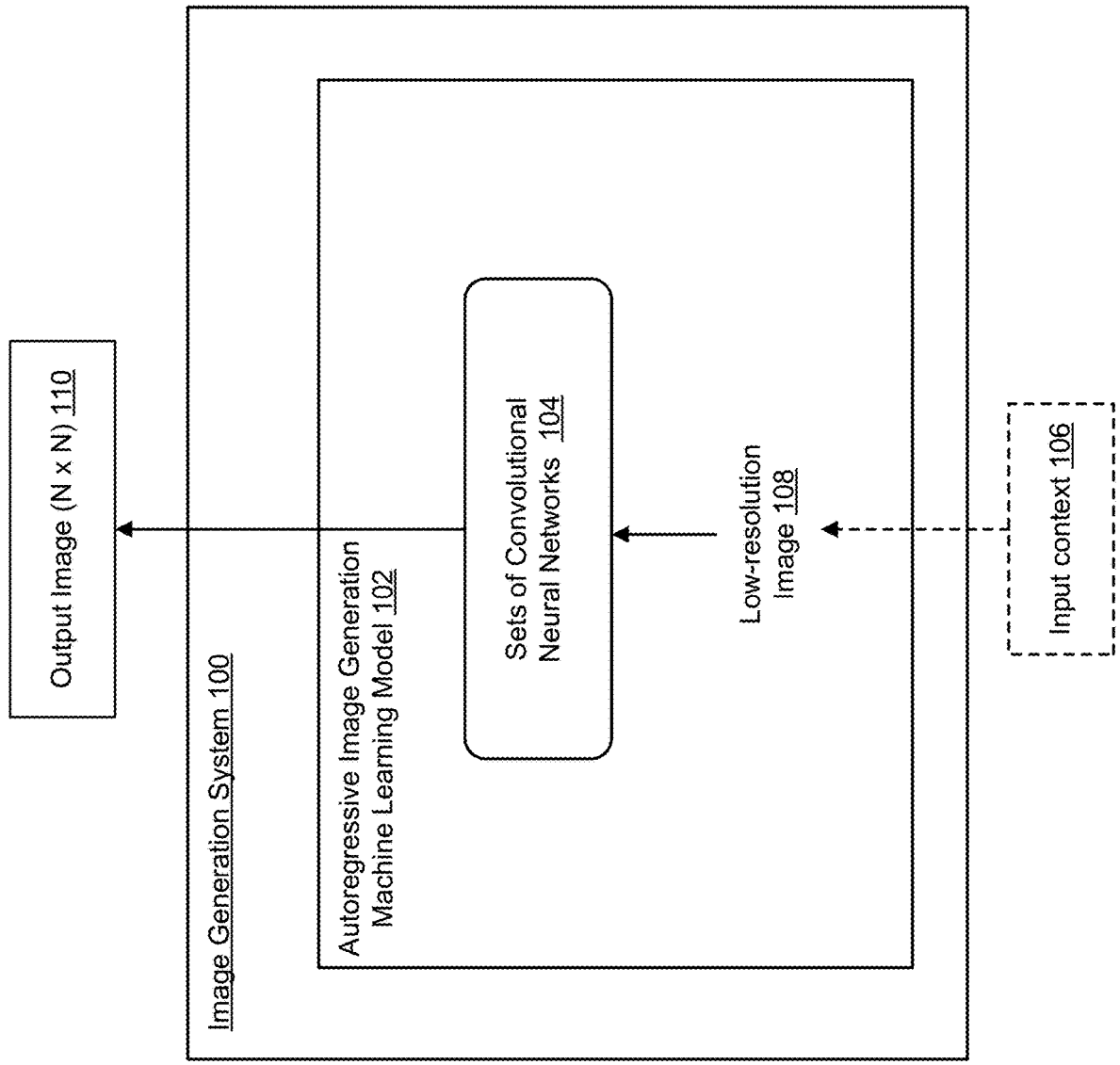
FIG. 1 is a block diagram of an example of an image generation system.

FIG. 1 shows an example of an image generation system 100. The system 100 is an example of a system implemented as computer programs on one or more computers in one or more locations, in which the systems, components, and techniques described below can be implemented. Generally, the system 100 is configured to generate an output image 110 using an autoregressive image generation machine learning model 102 (hereinafter referred to as "autoregressive model 102"). The autoregressive model 102 includes multiple sets of convolutional neural networks (CNNs) 104.

In particular, to generate the output image 110, the autoregressive model 102 first generates an initial low-resolution image 108 of the output image 110. In some implementations, the autoregressive model 102 can randomly sample the initial low-resolution image 108 from a set of low-resolution images.

In some other implementations, the autoregressive model 102 generates the initial low-resolution image 108 conditioned on an input context 106. Generating the initial low-resolution image 108 can be performed using a conventional autoregressive model, e.g., a model that generates high-quality images but is computationally intensive. An example of a conventional autoregressive model is described in Van den Oord et al., "Conditional Image Generation with PixelCNN Decoders," published at https://arxiv.org/abs/1606.05328.

Generally, the input context 106 is a representation, i.e., a tensor, e.g., a vector, a matrix, or a higher-order tensor, of external information that should influence the color values of the pixels in the output image. In some cases, the external information can be a text description. A text description can be, for instance, a caption describing an object in the output image, e.g., "A large brown bird with a bright green head, yellow bill and orange feet." In some cases, the external information can be an image segmentation. An image segmentation may include an image masked with the largest object in the output image, i.e., only the foreground pixels in the output image are included. In some cases, the external information may include keypoints specifying the location or shape of one or more objects in the output image. In some other cases, the external information may include one or more previous video frames. In these cases, the system 100 can be implemented on an image decoding device, e.g., a mobile device or another kind of user computer, and used to decode received encoded images or received encoded video frames.

In some implementations, instead of generating the low-resolution 108, the autoregressive model 102 can obtain the low-resolution version 108 as an input, e.g., from another system.

After generating or obtaining the low-resolution image 108 of the output image 110, the autoregressive model 102 upscales the low-resolution version 108 using the sets of CNNs 104 in order to generate the output image 110 having a final desired output resolution (e.g., N pixels×N pixels). For example, in some implementations, the initial low-resolution image 108 has a resolution of 4 pixels×4 pixels and the output image 110 has a resolution of 128 pixels×128 pixels. Generally, the autoregressive model 102 upscales the low-resolution image 108 by generating higher-resolution images following a "coarse-to-fine ordering of pixels" principle. That means the model 102 successively generates higher-resolution images that are generated conditioned on the previous resolution.

The autoregressive model 102, which generates successively higher-resolution images, as described in this specification has multiple technical advantages over existing image generation models.

Some previous autoregressive image generation models factorize the joint distribution of images into per-pixel factors. In particular, these models compute the joint distribution of T pixels over an image as the following product of conditional distributions, where $x_t$ is a single pixel:

$$p(x_{1:T}) = \prod_{t=1}^{T} p(x_t \mid x_{1:t-1}) \quad (1)$$

These models require inference to proceed sequentially pixel-by-pixel in raster order (i.e., row by row and pixel by pixel within every row) due to the causal structure of the conditional distributions. This requires a full network evaluation per pixel, which is costly, i.e., which requires a large amount of computational resources to generate an entire image because of the large number of full network evaluations required.

In contrast, the autoregressive model 102 described in this description reduces computational costs and accelerates training and inference by factorizing the joint distribution of images into pixel groups factors. This approach can be viewed as a way to merge per-pixel factors, thus cutting some spatial dependencies relied on by existing autoregressive image generation models and allowing for parallel sampling. As a result, the processing time required to generate an output image can be greatly reduced with little to no degradation in the quality of the output image. For example, the autoregressive model 102 can allow processing an N-pixels image in O(log N) time, instead of O(N) as in conventional autoregressive models.

In particular, assuming N pixels of an image (rather than the $N^2$ mentioned elsewhere) are divided into G groups of T pixels each, the autoregressive model 102 computes the joint distribution of T pixels over an image as a product of the corresponding G factors:

$$p(x_{1:T}^{1:G}) = \prod_{g=1}^{G} p(x_{1:T}^{(g)} \mid x_{1:T}^{(1:g-1)}) \quad (2)$$

Equation (2) assumes that each of the groups includes T pixels, but in practice this number may vary.

During training, the system 100 trains the autoregressive model 102 on a training dataset by adjusting the values of parameters θ of the autoregressive model 102 to maximize log P(x; θ). Since the joint distribution factorizes over pixel groups and scales, the training can be effectively parallelized, i.e., processing of the convolutional neural networks in the autoregressive model 102 can be parallelized during training. Therefore, the convolutional neural networks in the model 102 can be trained in a resource and time-efficient manner.

Once trained, the autoregressive model 102 upscales the low-resolution image 108, for example by iteratively performing the following operations: obtaining a current version of the output image having a current K×K resolution, i.e., the version of the image from the previous iteration, and processing the current version of the output image using a set of CNNs and a predefined grouping and ordering rule that are specific to the current resolution to generate an updated version of the output image having a 2K×2K resolution. The above operations are repeatedly performed until a desirable resolution (e.g., N×N) is obtained.

Figure 2:
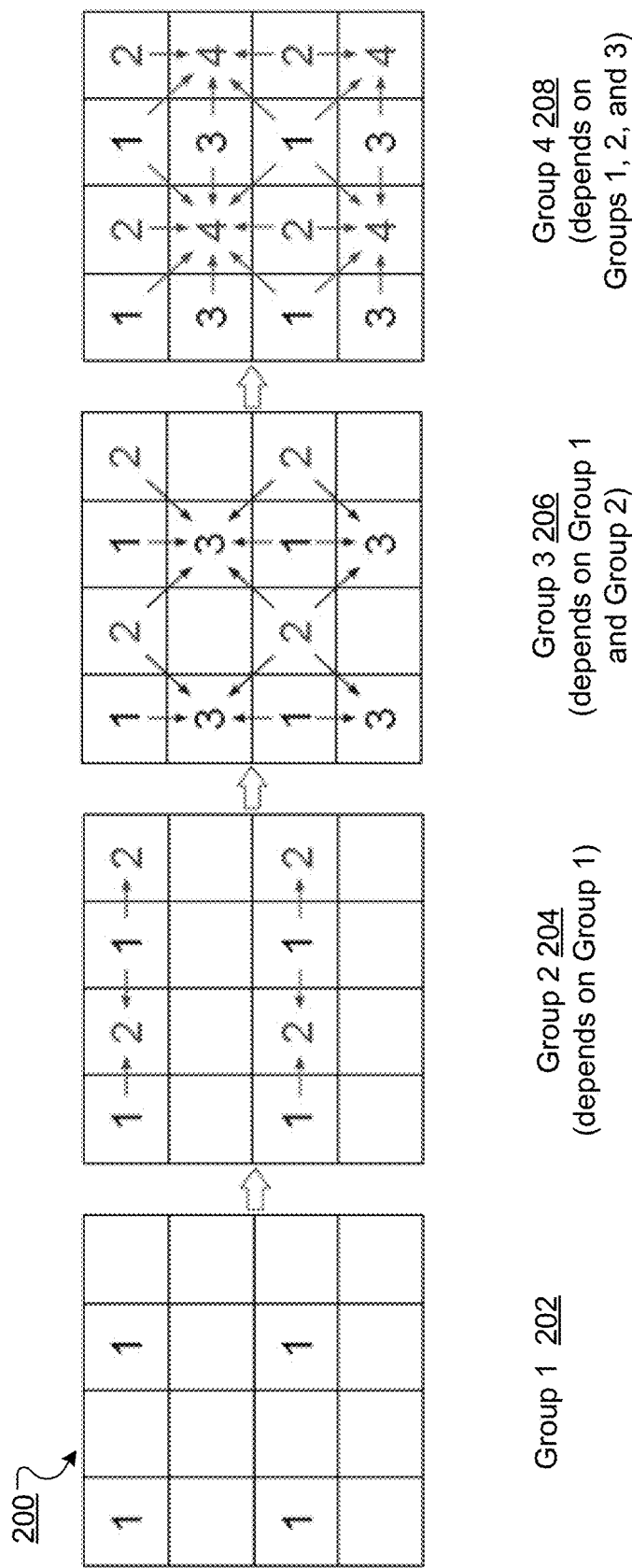
FIG. 2 is a block diagram of an example pixel grouping and ordering rule.

A predefined grouping and ordering rule specifies how pixels are grouped in a predetermined way so as to exploit spatial locality at each resolution, i.e., no two adjacent pixels of an image are in the same group. FIG. 2 shows an example grouping and ordering rule in which an image is divided into disjoint group of pixels, with autoregressive structure among the groups, i.e., each group of pixels can be successively generated conditioned on the previously generated groups of pixels.

To upscale an image from a given K×K resolution to 2K×2K resolution, the autoregressive model 102 processes the current version having the given resolution using a first CNN in the set of CNNs and a set of pixel groups specific to the given resolution. The set of pixel groups is formed according to the predefined grouping and ordering rule. The first CNN is configured to generate a first output image, which corresponds to a new pixel group, based on previous pixel groups included in the current image. The autoregressive model 102 then generates an intermediate version (e.g., a K×2K version or a 2K×K version of the output image) by merging the current version and the first output image according to the predefined grouping and ordering rule. The autoregressive model 102 processes the intermediate version using a second CNN in the set of CNNs to generate a second output image in a similar manner. The autoregressive model 102 generates a 2K×2K version by merging the intermediate version and the second output image according to the predefined grouping and ordering rule.

In some implementations, each pixel in a higher resolution image generated by the CNNs (e.g., the first output image and second output image in each iteration) has a respective color value for each channel in a set of multiple color channels. For example, the set of color channels may include {red, green, blue} or {cyan, magenta, yellow, black}. The color channels in the set are ordered according to a channel order, for example, RGB order or CMYK order. The first and second convolutional networks take into account the channel order when generating the first output image and the second output image. The process for generating color values for color channels for pixels in the first output image and second output image is described in more detail below with reference to FIG. 4.

In some implementations, when the initial low-resolution image 108 generated by the autoregressive model 102 is conditioned on the input context 106, each set of CNNs used to generate the higher-resolution images is conditioned on the input context 106.

The process for processing a current version of an output image to generate an updated version of the output image is described in more detail below with reference to FIG. 3.

As an illustrative example, when the initial low-resolution is 4×4 and the final desired output resolution is 128×128, the model 102 uses one set of CNNs to generate an 8×8 image from the 4×4 image, another set of CNNs to generate a 16×16 image from the 8×8 image, another set of CNNs to generate a 32×32 image from the 16×16 image, another set of CNNs to generate a 64×64 image from the 32×32 image, and another set of CNNs to generate the final 128×128 image from the 64×64 image.

FIG. 2 is a block diagram that shows an example pixel grouping and ordering rule for an image 200.

Generally, pixels in the image 200 are grouped in a way that no two adjacent pixels of the image 200 are in the same group, thus allowing adjacent pixels to be generated in parallel, which could greatly accelerate the generation of higher-resolution images during training and inference.

In this example, the image 200 has a resolution of 4 pixels×4 pixels. The image 200 can be divided into disjoint group of pixels using the following rule. To create groups, the image 200 is tiled with 2×2 blocks. The corners of these 2×2 blocks form the four pixel groups at a given scale, i.e., upper-left, upper-right, lower-left, and lower-right. In particular, the upper left corner pixels form group 1 pixels (202). The upper right corner pixels form group 2 pixels (204). The lower left corner pixels form group 3 pixels (206). The lower right corner pixels form group 4 pixels (208). Each group of pixels corresponds to a factor in the joint distribution of Eq. 2.

Pixels in a given group depend on pixels in one or more preceding groups. For clarity, FIG. 2 uses arrows to indicate immediately-neighboring dependencies, but all pixels in preceding groups can be used to predict (i.e., generate) all pixels in a given group. For example, all pixels in group 2 can be used to predict pixels in group 4. In some implementations, pixels in group 1 can originate from a lower-resolution image. In some implementations, pixels in group 1 can be generated given previous frames in a video.

While there are no two adjacent pixels of the image 200 are in the same group, some pairs of pixels both within each block and also across blocks can still be dependent. These additional dependencies allow for capturing local textures and avoiding border artifacts.

Figure 3:
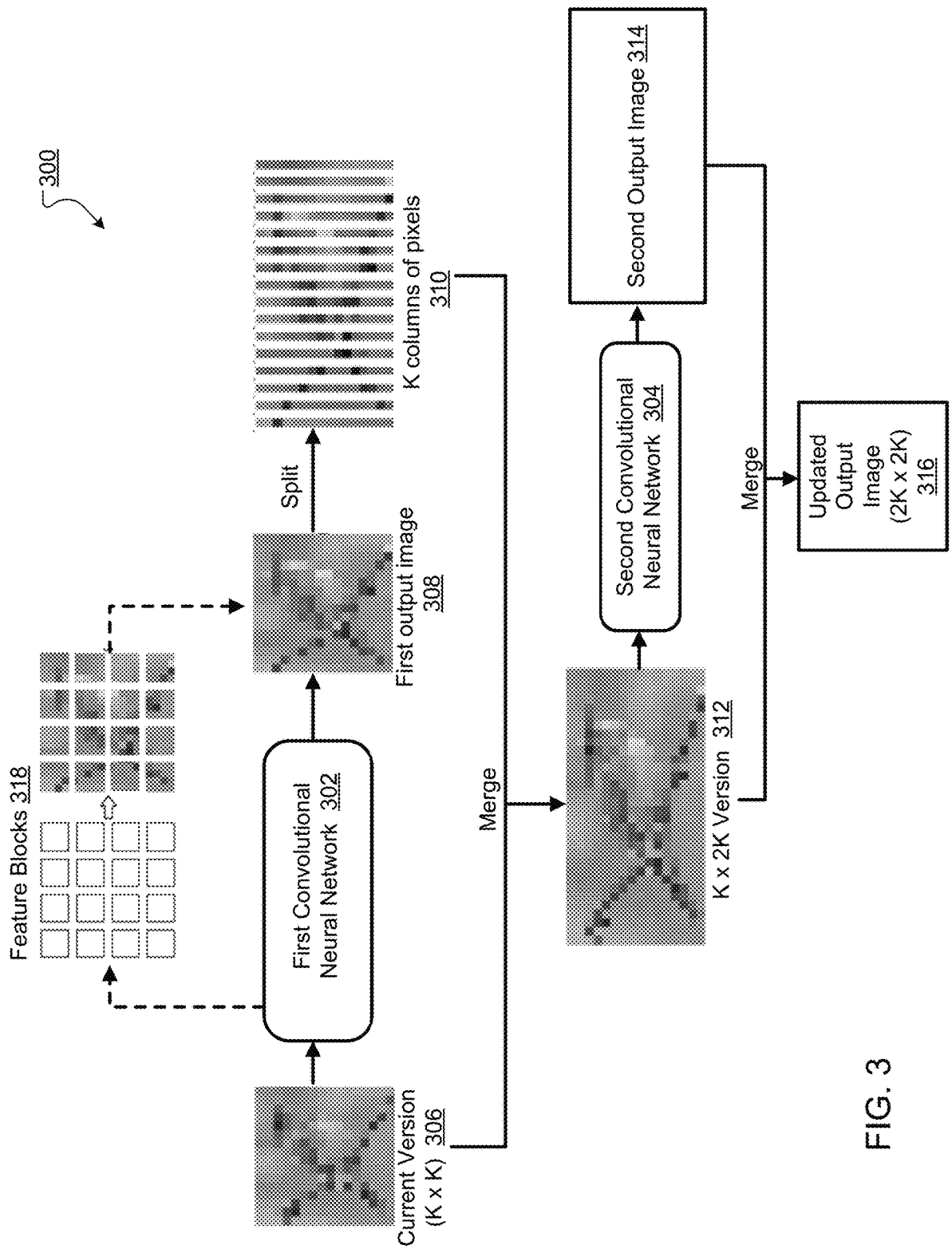
FIG. 3 is a block diagram of an example process for processing a current version of an output image to generate an updated version of the output image.

FIG. 3 is a block diagram of an example process for processing a current version of an output image (K×K) to generate an updated version of the output image (2K×2K). For convenience, the process 300 will be described as being performed by a system of one or more computers located in one or more locations. For example, an image generation system, e.g., the image generation system 100 of FIG. 1, appropriately programmed in accordance with this specification, can perform the process 300.

The system obtains a current version 306 of the output image. The current version 306 has a current K×K resolution. In some cases, the current version 306 can be an initial low resolution image of the output image (e.g., the initial low resolution image 108 of FIG. 1) that the system generates using an autoregressive image generation machine learning model. In some other cases, the current version 306 of the output image can be an image generated during the previous iteration of the process 300.

The system processes the current version 306 using a first CNN 302 to generate the first output image 308. The first CNN 302 is configured to receive the current version 306 of the output image and to generate a first output image 308 conditioned on the current version 306. The first output image 308 includes columns of pixels or rows of pixels used by the system to generate a subsequent version of the output image having a higher resolution than the current version.

In some implementations, the first CNN 302 is configured to directly generate the first output image 308 from the current version 306. In these implementations, the first CNN 302 may include one or more residual neural network layers.

In some other implementations, the first CNN 302 may include one or more residual neural network layers and one or more convolutional neural network layers. The one or more residual neural network layers extract features of the current version to form a feature map and splits the feature map into spatially contiguous feature blocks 318 which, in implementations, are non-overlapping. The one or more convolutional neural network layers then provides these blocks in parallel (i.e., by generating respective pixel values and/or color values for each of the feature block 318) to form the first output image 308. An example CNN that can be used to provide these blocks is a shallow PixelCNN through which the feature map blocks may be fed. A shallow PixelCNN is a standard PixelCNN with a small number of layers (e.g. less than 5), which can result in faster sampling compared to deeper neural networks.

As an illustrative example, the current version 306 may include the 4 upper left corner pixels that formed group 1 pixels in FIG. 2. The first CNN 302 may use group 1 pixels to generate the first output image 310 that includes group 2 pixels, i.e., the 4 upper-right corner pixels. The first CNN 302 may include one or more residual neural network layers.

The system splits the first output image 308 into K columns of pixels 310. The system then alternates K columns of pixels from the current version 306 with K columns of pixels 310 from the first output image 308 and merges them to create the K×2K version 312.

The system processes the K×2K version 312 using a second convolutional neural network 304 to generate the second output image 314. The second CNN 304 is configured to receive the K×2K version 312 and to generate a second output image 314 that includes rows of pixels to be used to generate the 2K×2K version of the output image. The second CNN 304 may include one or more residual neural network layers.

The system generates the updated output image 316 (i.e. the 2K×2K version) by merging the K×2K version 312 and the second output image 314. In particular, the system generates the 2K×2K image 316 that includes K rows of pixels from the K×2K version 312 and K rows of pixels from the second output image 314 by alternating rows of pixels from the K×2K version with rows of pixels from the second output image.

During training, the system trains all sets of CNNs (each set of CNN is used for an iteration of the process 300) by adjusting the values of parameters θ of the CNNs to optimize an objective function. Assuming the N pixels of an output image for a given input are divided into G groups of T pixels each, the system trains the CNNs to maximize log P(x; θ), where P(x, θ) denotes a joint distribution of T pixels over the output image given the values of parameters θ. As previously described, the joint distribution of T pixels over an image as a product of the corresponding G factors is:

$$p(x_{1:T}^{1:G}) = \prod_{g=1}^{G} p(x_{1:T}^{(g)} | x_{1:T}^{(1:g-1)}) \quad (2)$$

Since the joint distribution factorizes over pixel groups and scales, and since pixels in the output image may be grouped in a way that no two adjacent pixels of the output image are in the same group (i.e. pixels in the same group are independent with each other), the training of the CNNs can be effectively parallelized. In particular, at training time, losses and gradients for all of the pixels within a group can be computed in parallel. Therefore, the convolutional neural networks can be trained in a resource and time-efficient manner. The system can train the CNNs using a conventional training technique such as stochastic gradient descent or gradient descent method.

Figure 4:
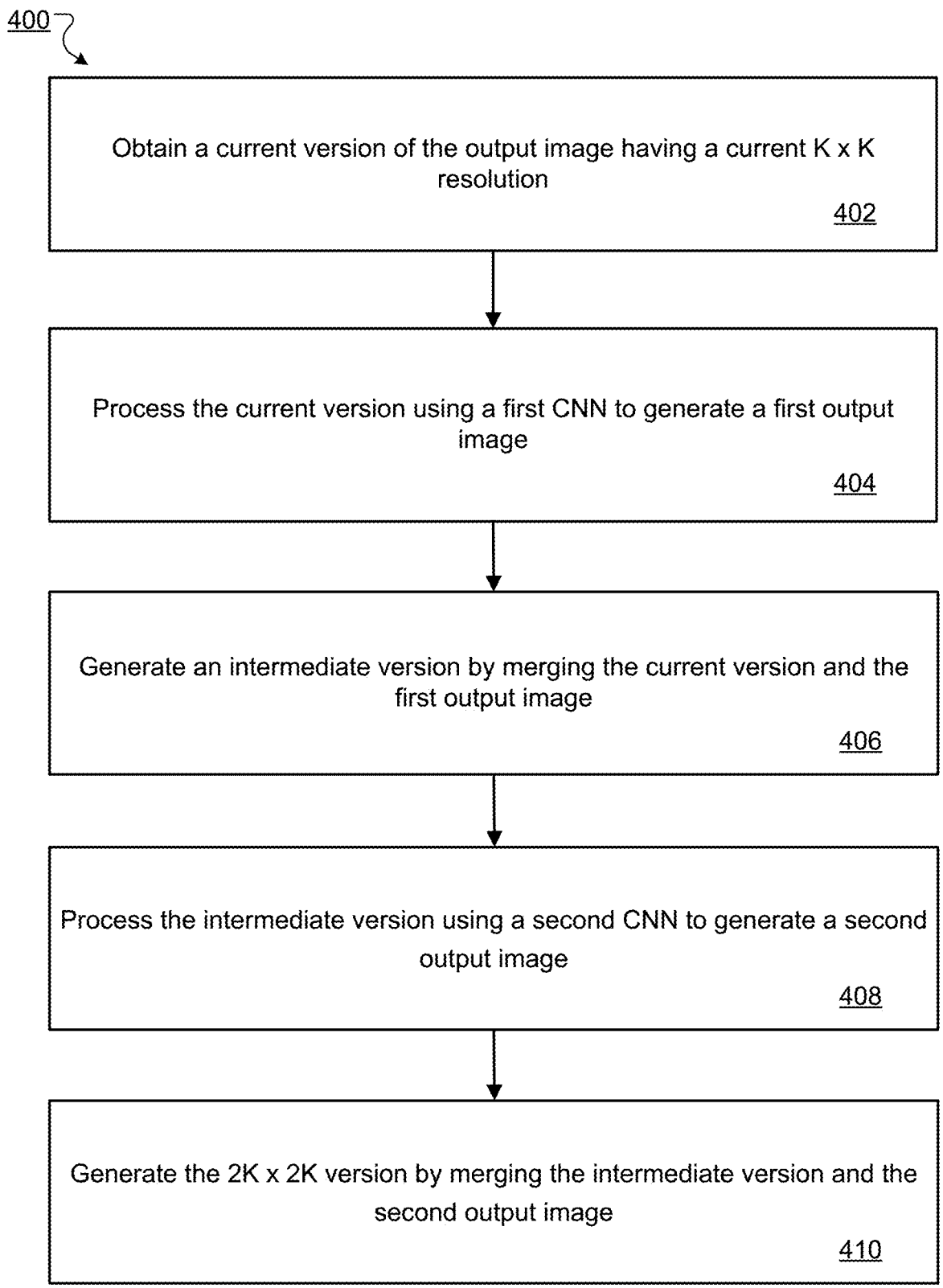
FIG. 4 is a flowchart of an example process for processing a current version of an output image to generate an updated version of the output image.

FIG. 4 is a flowchart of an example process for processing a current version of an output image to generate an updated version of the output image. For convenience, the process 400 will be described as being performed by a system of one or more computers located in one or more locations. For example, an image generation system, e.g., the image generation system 100 of FIG. 1, appropriately programmed in accordance with this specification, can perform the process 400.

The system obtains a current version of the output image having a current K×K resolution (step 402).

The system processes the current version using a first CNN to generate a first output image (step 404). The first CNN generates the first output image conditioned on the pixels in the current version. The first output image includes columns of pixels or rows of pixels to be used to generate an intermediate version of the output image having a higher resolution than the current version.

In some cases, each pixel in the first output image may have a respective color value for each color channel in a set of color channels, e.g., red, green, and blue channels. The color channels in the set are ordered according to a channel order, e.g., RGB order. In these cases, the first CNN is configured to generate color values for color channels for pixels in the first output image based on color channel dependencies defined by the channel order, e.g., green depends on red, blue depends on red and green. Specifically, the first CNN is configured to, for each of the color channels, generate color values for the color channel for pixels in the first output image conditioned (i) on the current version and (ii) on color values for pixels in the first output image for any color channels before the color channel in the channel order and (iii) not on color values for pixels in the first output image for any color channels that are after the color channel in the channel order. The first CNN iteratively processes the current version and color values from the first output image that have already been generated to generate the first output image. The first CNN is a CNN with channel-wise masked convolutions to capture the color dependencies. The number of channel-wise masked convolutions depend on the number of color channels in the set of color channels.

For example, if the set of color channels has three color channels, then the first CNN has three channel-wise masked convolutions to produce the three color channels. In this example, the first CNN processes the current version of the output image to generate the values of the first color channel, then processes the current version and the values of the first color channel to generate the values of the second color channel, and then process the current version and the first two color channel values to generate the values of the third color channel.

The system generates an intermediate version of the output image by merging the current version and the first output image (step 406).

In some implementations, the intermediate version of the output image is a K×2K version of the output image. The first output image generated by the first CNN includes K columns of pixels used to generate the K×2K version. The system generates the K×2K version that includes K columns of pixels from the current version and K columns of pixels from the first output image by alternating K columns of pixels from the current version with K columns of pixels from the first output image.

In some other implementations, the intermediate version of the output image is a 2K×K version of the output image. In these implementations, the first output image generated by the first CNN includes K rows of pixels used to generate the 2K×K version. The system generates the 2K×K version that includes K rows of pixels from the current version and K rows of pixels from the first output image by alternating K rows of pixels from the current version with K rows of pixels from the first output image.

The system processes the intermediate version using a second CNN to generate a second output image (step 408).

The second CNN generates the second output image conditioned on the intermediate version. The second output image includes rows of pixels or columns of pixels to be used to generate the 2K×2K version of the output image.

In some cases, each pixel in the second output image may have a respective color value for each color channel in the above-described set of color channels. The second CNN is configured to, for each of the color channels, generate color values for the color channel for pixels in the second output image conditioned (i) on the intermediate version and (ii) on color values for pixels in the second output image for any color channels before the color channel in the channel order and (iii) not on color values for pixels in the second output image for any color channels that are after the color channel in the channel order. The second CNN iteratively processes the intermediate version and the color values from the second output image that have already been generated to generate the second output image. The second CNN is a CNN with channel-wise masked convolutions to capture the color dependencies. The number of channel-wise masked convolutions depend on the number of color channels in the set of color channels. For example, if the set of color channels has three color channels, then the second CNN has three channel-wise masked convolutions to produce the three color channels.

The system generates the updated version of the output image having 2K×2K resolution by merging the intermediate version and the second output image (step 410).

In particular, when the intermediate version of the output image is a K×2K version, the system generates the 2K×2K version by alternating rows of pixels from the K×2K version with rows of pixels from the second output image.

When the intermediate version of the output image is a 2K×K version, the system generates the 2K×2K version by alternating columns of pixels from the 2K×K version with columns of pixels from the second output image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating an output image having an output resolution, each pixel in the output image having a respective value for each of one or more channels, the method comprising:
    obtaining a low-resolution version of the output image; and
    upscaling the low-resolution version of the output image to generate the output image having the output resolution by repeatedly performing the following operations until an image with an output resolution is obtained:
        obtaining a current version of the output image having a current resolution; and
        processing the current version of the output image using a set of convolutional neural networks that are specific to the current resolution to generate an updated version of the output image having an updated resolution that is higher than the current resolution,
    wherein the set of convolutional neural networks that are specific to the current resolution comprises:
    a first convolutional neural network that is configured to receive a first input comprising the current version of the image and to generate a first output image that includes columns of pixels from an intermediate version of the output image having an intermediate resolution that is higher than the current resolution but lower than the updated resolution, and
    a second convolutional neural network that is configured to receive a second input comprising the intermediate version of the output image and to generate a second output image that includes rows of pixels from the updated version of the output image.

2. The method of claim 1, wherein obtaining the low-resolution version comprises:
    generating the low-resolution version using an image generation machine learning model.

3. The method of claim 2, wherein the image generation machine learning model is an autoregressive image generation machine learning model.

4. The method of claim 2, wherein the output image is conditioned on an input context and wherein the image generation machine learning model is configured to generate the low-resolution version conditioned on the input context.

5. The method of claim 4, wherein each convolutional neural network in each set of convolutional neural networks is conditioned on the input context.

6. The method of claim 1, wherein processing the current version of the output image using the set of convolutional neural networks that are specific to the current resolution to generate the updated version of the output image comprises:
    processing the current version of the output image using the first convolutional neural network to generate the first output image; generating the intermediate version by merging the current version and the first output image; processing the intermediate version using the second convolutional neural network to generate the second output image; and generating the updated version by merging the intermediate version and the second output image.

7. The method of claim 6, wherein merging the current version and the first output image comprises:
generating an intermediate image that includes K columns of pixels from the current image and K columns of pixels from the first output image by alternating columns of pixels from the current version with columns of pixels from the first output image.

8. The method of claim 6, wherein merging the intermediate version and the second output image comprises:
generating an updated image that includes a plurality of rows of pixels from the intermediate version and a plurality of rows of pixels from the second output image by alternating rows of pixels from the intermediate version with rows of pixels from the second output image.

9. The method of claim 6,
wherein the one or more channels are ordered according to a channel order,
wherein the first convolutional neural network is configured to, for each of the one or more channels:
generate values for the channel for pixels in the first output image conditioned (i) on the current version and (ii) on values for pixels in the first output image for any channels before the channel in the channel order and (iii) not on values for pixels in the first output image for any channels that are after the channel in the channel order, and
wherein the second convolutional neural network is configured to, for each of the one or more channels:
generate values for the channel for pixels in the second output image conditioned (i) on the intermediate version and (ii) on values for pixels in the second output image for any channels before the channel in the channel order and (iii) not on values for pixels in the second output image for any channels that are after the channel in the channel order.

10. The method of claim 9, wherein processing the current version using the first convolutional neural network to generate the first output image comprises:
iteratively processing the current version and values from the first output image that have already been generated to generate the first output image, and
wherein processing the intermediate version using the second convolutional neural network to generate the second output image comprises:
iteratively processing the intermediate version and the values from the second output image that have already been generated to generate the second output image.

11. A method of generating an output image having an output resolution, each pixel in the output image having a respective value for each of one or more channels, the method comprising:
obtaining a low-resolution version of the output image; and
upscaling the low-resolution version of the output image to generate the output image having the output resolution by repeatedly performing the following operations until an image with an output resolution is obtained:
obtaining a current version of the output image having a current resolution; and
processing the current version of the output image using a set of convolutional neural networks that are specific to the current resolution to generate an updated version of the output image having an updated resolution that is higher than the current resolution, wherein the set of convolutional neural networks that are specific to the current resolution comprises:
a first convolutional neural network that is configured to receive a first input comprising the current version of the image and to generate a first output image that includes rows of pixels from an intermediate version of the output image having an intermediate resolution that is higher than the current resolution but lower than the updated resolution, and
a second convolutional neural network that is configured to receive a second input comprising the intermediate version of the output image and to generate a second output image that includes columns of pixels from the updated version of the output image.

12. The method of claim 11, wherein processing the current version of the output image using the set of convolutional neural networks that are specific to the current resolution to generate the updated version comprises:
processing the current version using the first convolutional neural network to generate the first output image;
generating the intermediate version by merging the current version and the first output image;
processing the intermediate version using the second convolutional neural network to generate the second output image; and
generating the updated version by merging the intermediate version and the second output image.

13. The method of claim 12, wherein merging the current version and the first output image comprises:
generating an intermediate image that includes rows of pixels from the current image and rows of pixels from the first output image by alternating rows of pixels from the current version with rows of pixels from the first output image.

14. The method of claim 12, wherein merging the intermediate version and the second output image comprises:
generating an updated image that includes columns of pixels from the intermediate version and columns of pixels from the second output image by alternating columns of pixels from the intermediate version with columns of pixels from the second output image.

15. The method of claim 11,
wherein the one or more channels are ordered according to a channel order,
wherein the first convolutional neural network is configured to, for each of the one or more channels:
generate values for the channel for pixels in the first output image conditioned (i) on the current version and (ii) on values for pixels in the first output image for any channels before the channel in the channel order and (iii) not on values for pixels in the first output image for any channels that are after the channel in the channel order, and
wherein the second convolutional neural network is configured to, for each of the channels:
generate values for the channel for pixels in the second output image conditioned (i) on the intermediate version and (ii) on values for pixels in the second output image for any channels before the channel in the channel order and (iii) not on values for pixels in the second output image for any channels that are after the channel in the channel order.

16. The method of claim 15, wherein processing the current version using the first convolutional neural network to generate the first output image comprises:

iteratively processing the current version and values from the first output image that have already been generated to generate the first output image, and
wherein processing the intermediate version using the second convolutional neural network to generate the second output image comprises:
iteratively processing the intermediate version and the values from the second output image that have already been generated to generate the second output image.

17. The method of claim 11, wherein obtaining the low-resolution version comprises:
generating the low-resolution version using an image generation machine learning model.

18. The method of claim 17, wherein the image generation machine learning model is an autoregressive image generation machine learning model.

19. The method of claim 18, wherein the output image is conditioned on an input context and wherein the image generation machine learning model is configured to generate the low-resolution version conditioned on the input context.

20. The method of claim 19, wherein each convolutional neural network in each set of convolutional neural networks is conditioned on the input context.

21. A system comprising one or more computers and one or more storage devices storing instructions that when executed by the one or more computers cause the one or more computers to perform operations for generating an output image having an output resolution, each pixel in the output image having a respective value for each of one or more channels, the operations comprising:
obtaining a low-resolution version of the output image; and
upscaling the low-resolution version of the output image to generate the output image having the output resolution by repeatedly performing the following operations until an image with an output resolution is obtained:
obtaining a current version of the output image having a current resolution; and
processing the current version of the output image using a set of convolutional neural networks that are specific to the current resolution to generate an updated version of the output image having an updated resolution that is higher than the current resolution,
wherein the set of convolutional neural networks that are specific to the current resolution comprises:
a first convolutional neural network that is configured to receive a first input comprising the current version of the image and to generate a first output image that includes columns of pixels from an intermediate version of the output image having an intermediate resolution that is higher than the current resolution but lower than the updated resolution, and
a second convolutional neural network that is configured to receive a second input comprising the intermediate version of the output image and to generate a second output image that includes rows of pixels from the updated version of the output image.

22. The system of claim 21, wherein the operations for processing the current version of the output image using the set of convolutional neural networks that are specific to the current resolution to generate the updated version of the output image comprise:
processing the current version of the output image using the first convolutional neural network to generate the first output image;
generating the intermediate version by merging the current version and the first output image;
processing the intermediate version using the second convolutional neural network to generate the second output image; and
generating the updated version by merging the intermediate version and the second output image.

23. The system of claim 22, wherein the operations for merging the current version and the first output image comprise:
generating a intermediate image that includes columns of pixels from the current image and columns of pixels from the first output image by alternating columns of pixels from the current version with columns of pixels from the first output image.

24. The system of claim 22, wherein the operations for merging the intermediate version and the second output image comprises:
generating an updated image that includes rows of pixels from the intermediate version and rows of pixels from the second output image by alternating the rows of pixels from the intermediate version with the rows of pixels from the second output image.

25. The system of claim 22,
wherein the one or more channels are ordered according to a channel order,
wherein the first convolutional neural network is configured to, for each of the one or more channels:
generate values for the channel for pixels in the first output image conditioned (i) on the current version and (ii) on values for pixels in the first output image for any channels before the channel in the channel order and (iii) not on values for pixels in the first output image for any channels that are after the channel in the channel order, and
wherein the second convolutional neural network is configured to, for each of the one or more channels:
generate values for the channel for pixels in the second output image conditioned (i) on the intermediate version and (ii) on values for pixels in the second output image for any channels before the channel in the channel order and (iii) not on values for pixels in the second output image for any channels that are after the channel in the channel order.

26. The system of claim 25, wherein the operations for processing the current version using the first convolutional neural network to generate the first output image comprise:
iteratively processing the current version and values from the first output image that have already been generated to generate the first output image, and
wherein processing the intermediate version using the second convolutional neural network to generate the second output image comprises:
iteratively processing the intermediate version and the values from the second output image that have already been generated to generate the second output image.

27. A system comprising one or more computers and one or more storage devices storing instructions that when executed by the one or more computers cause the one or more computers to perform operations for generating an output image having an output resolution, each pixel in the output image having a respective value for each of one or more channels, the operations comprising:
obtaining a low-resolution version of the output image; and
upscaling the low-resolution version of the output image to generate the output image having the output resolution by repeatedly performing the following operations until an image with an output resolution is obtained:
  obtaining a current version of the output image having a current resolution; and
  processing the current version of the output image using a set of convolutional neural networks that are specific to the current resolution to generate an updated version of the output image having an updated resolution that is higher than the current resolution, wherein the set of convolutional neural networks that are specific to the current resolution comprises:
    a first convolutional neural network that is configured to receive a first input comprising the current version of the image and to generate a first output image that includes rows of pixels from an intermediate version of the output image having an intermediate resolution that is higher than the current resolution but lower than the updated resolution, and
    a second convolutional neural network that is configured to receive a second input comprising the intermediate version of the output image and to generate a second output image that includes columns of pixels from the updated version of the output image.

28. The system of claim 27, wherein the operations for processing the current version of the output image using the set of convolutional neural networks that are specific to the current resolution to generate the updated version comprise:
  processing the current version using the first convolutional neural network to generate the first output image;
  generating the intermediate version by merging the current version and the first output image;
  processing the intermediate version using the second convolutional neural network to generate the second output image; and
  generating the updated version by merging the intermediate version and the second output image.

29. The system of claim 28, wherein the operations for merging the current version and the first output image comprise:
  generating an intermediate image that includes rows of pixels from the current image and rows of pixels from the first output image by alternating the rows of pixels from the current version with the rows of pixels from the first output image.

30. The system of claim 28, wherein the operations for merging the intermediate version and the second output image comprise:
  generating an updated image that includes columns of pixels from the intermediate version and columns of pixels from the second output image by alternating the columns of pixels from the intermediate version with the columns of pixels from the second output image.

31. The system of claim 27,
  wherein the one or more channels are ordered according to a channel order,
  wherein the first convolutional neural network is configured to, for each of the one or more channels:
  generate values for the channel for pixels in the first output image conditioned (i) on the current version and (ii) on values for pixels in the first output image for any channels before the channel in the channel order and (iii) not on values for pixels in the first output image for any channels that are after the channel in the channel order, and
  wherein the second convolutional neural network is configured to, for each of the channels:
  generate values for the channel for pixels in the second output image conditioned (i) on the intermediate version and (ii) on values for pixels in the second output image for any channels before the channel in the channel order and (iii) not on values for pixels in the second output image for any channels that are after the channel in the channel order.

32. The system of claim 31, wherein processing the current version using the first convolutional neural network to generate the first output image comprises:
  iteratively processing the current version and values from the first output image that have already been generated to generate the first output image, and
  wherein processing the intermediate version using the second convolutional neural network to generate the second output image comprises:
  iteratively processing the intermediate version and the values from the second output image that have already been generated to generate the second output image.

33. One or more non-transitory computer storage media storing instructions that, when executed by one or more computers, cause the one or more computers to perform operations for generating an output image having an output resolution, each pixel in the output image having a respective value for each of one or more channels, the operations comprising:
  obtaining a low-resolution version of the output image; and
  upscaling the low-resolution version of the output image to generate the output image having the output resolution by repeatedly performing the following operations until an image with an output resolution is obtained:
    obtaining a current version of the output image having a current resolution; and
    processing the current version of the output image using a set of convolutional neural networks that are specific to the current resolution to generate an updated version of the output image having an updated resolution that is higher than the current resolution,
  wherein the set of convolutional neural networks that are specific to the current resolution comprises:
    a first convolutional neural network that is configured to receive a first input comprising the current version of the image and to generate a first output image that includes columns of pixels from an intermediate version of the output image having an intermediate resolution that is higher than the current resolution but lower than the updated resolution, and
    a second convolutional neural network that is configured to receive a second input comprising the intermediate version of the output image and to generate a second output image that includes rows of pixels from the updated version of the output image.

34. One or more non-transitory computer storage media storing instructions that, when executed by one or more computers, cause the one or more computers to perform operations for generating an output image having an output resolution, each pixel in the output image having a respective value for each of one or more channels, the operations comprising:
  obtaining a low-resolution version of the output image; and
  upscaling the low-resolution version of the output image to generate the output image having the output resolution by repeatedly performing the following operations until an image with an output resolution is obtained:

obtaining a current version of the output image having a current resolution; and processing the current version of the output image using a set of convolutional neural networks that are specific to the current resolution to generate an updated version of the output image having an updated resolution that is higher than the current resolution, wherein the set of convolutional neural networks that are specific to the current resolution comprises:

a first convolutional neural network that is configured to receive a first input comprising the current version of the image and to generate a first output image that includes rows of pixels from an intermediate version of the output image having an intermediate resolution that is higher than the current resolution but lower than the updated resolution, and a second convolutional neural network that is configured to receive a second input comprising the intermediate version of the output image and to generate a second output image that includes columns of pixels from the updated version of the output image.

* * * * *